United States Patent
Horng et al.

(10) Patent No.: US 8,384,265 B2
(45) Date of Patent: Feb. 26, 2013

(54) INNER-ROTOR-TYPE MOTOR AND CLAW-POLE MEMBER THEREOF

(75) Inventors: Alex Horng, Kaohsiung (TW); Tso-Kuo Yin, Kaohsiung (TW); Chin-Chia Huang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 203 days.

(21) Appl. No.: 12/700,830

(22) Filed: Feb. 5, 2010

(65) Prior Publication Data

US 2011/0193445 A1    Aug. 11, 2011

(51) Int. Cl.
*H02K 1/06* (2006.01)
(52) U.S. Cl. ............... 310/216.093; 310/216.096
(58) Field of Classification Search ........... 310/216.091, 310/216.092, 216.093, 216.096, 216.097, 310/216.001
See application file for complete search history.

(56) References Cited

U.S. PATENT DOCUMENTS

| | | | |
|---|---|---|---|
| 2,240,652 A * | 5/1941 | Jenkins | 310/180 |
| 2,371,268 A * | 3/1945 | Scofield | 310/216.097 |
| 5,670,836 A * | 9/1997 | Horst | 310/156.15 |
| 7,339,301 B2 | 3/2008 | Chen et al. | |
| 2003/0011272 A1 * | 1/2003 | Kataoka et al. | 310/254 |
| 2005/0174008 A1 | 8/2005 | Tsai | |

FOREIGN PATENT DOCUMENTS

| TW | I300283 | 7/1993 |
|---|---|---|
| TW | 342688 | 5/1997 |
| TW | 200603514 | 1/2006 |

* cited by examiner

*Primary Examiner* — Nguyen N Hanh
(74) *Attorney, Agent, or Firm* — Alan Kamrath; Kamrath IP Lawfirm, PA

(57) ABSTRACT

An inner-rotor-type motor includes a casing, a shaft and a claw-pole member. The shaft is rotatably coupled to the casing, and coupled to a permanent magnet having a magnetism-inducing surface. The claw-pole member is coupled within the casing and has an annular portion and a plurality of salient-poles. The annular portion has an inner circumferential wall. Each salient-pole is disposed between the annular portion and a respective pole plate. Each pole plate has a first side and a second side. The first side and the second side oppose each other. A magnetic pole surface is formed between the first side and the second side and faces the magnetism-inducing surface of the permanent magnet. An air gap is formed between the magnetic pole surface and the magnetism-inducing surface. Each pole plate has an extension portion and a shrinking portion. The coil unit is coupled to the plurality of salient-poles.

18 Claims, 14 Drawing Sheets

INNER-ROTOR-TYPE MOTOR AND CLAW-POLE MEMBER THEREOF

BACKGROUND OF THE INVENTION

1. Field of the Invention

The present invention generally relates to a motor and, more particularly, to an easy-to-start inner-rotor-type motor capable of preventing the dead angle of starting the inner-rotor-type motor, as well as a claw-pole member thereof.

2. Description of the Related Art

Please refer to FIG. 1, an exploded diagram of a traditional outer-rotor-type motor is shown. The traditional outer-rotor-type motor 8 comprises a base 81, a stator 82 and a rotor 83. The base 81 is equipped with a shaft tube 811. The stator 82 comprises a plurality of claw-pole plates 821 and a coil unit 822. The plurality of claw-pole plates 821 is stacked with one another to form a claw-pole entity. The coil unit 822 is wound around a predetermined portion of the plurality of claw-pole plates 821. The rotor 83 is rotatably coupled with the shaft tube 811 of the base 81. As such, the stator 82 may drive the rotor 83 to rotate when being electrified.

Taiwan Patents No. M342688, 200603514, 1276281 and 1244817 disclose a variety of outer-rotor-type motors. Briefly, each of the traditional outer-rotor-type motors substantially employs different-structured stators to generate an uneven magnetism for triggering a rotation of the rotor, thereby allowing an easy start of the motors and preventing the dead angle of starting the motors.

Apart from the above-mentioned outer-rotor-type motors, the inner-rotor-type motors have also been widely used in the related field. In comparison with the outer-rotor-type motors, the inner-rotor-type motors actually provide better rotation stability and higher rated rotation speed. Accordingly, due to an increasing demand for high-speed, functionally-integrated and miniaturized electronic products, the inner-rotor-type motors are widely adopted in modern electronic products while the outer-rotor-type motors no longer satisfy the need for heat dissipation of certain electronic products.

For example, Taiwan Patent Publication No. 200744290 discloses an inner-rotor-type motor, as shown in FIG. 2. The inner-rotor-type motor 9 comprises a casing 91, a stator 92, a rotor 93, a driver 94 and a fan wheel 95. The casing 91 consists of a first part 911 and a second part 912, with both the first part 911 and the second part 912 having a bearing 913 disposed therein. The stator 92 has a magnetic-conducting element 921. The rotor 93 has a shaft 931 and a magnetic element 932. The shaft 931 is disposed inside the casing 91 and coupled with the two bearings 913, and the magnetic element 932 may be fitted to the shaft 931. The driver 94 is electrically connected to the magnetic-conducting element 921. The fan wheel 95 is coupled to the shaft 931 and located outside the casing 91. In this way, the driver 94 may control the current direction of the magnetic-conducting element 921 to trigger the operation of the rotor 93 and the fan wheel 95.

However, although the magnetic-conducting element 921 of the inner-rotor-type motor 9 is capable of triggering the operation of the rotor 93, it does not overcome the known problems such as difficulty in starting the motor and the dead angle of start. Therefore, there is a need to improve the traditional motors.

SUMMARY OF THE INVENTION

It is therefore the primary objective of this invention to improve upon the traditional inner-rotor-type motors by overcoming the difficulty in starting the inner-rotor-type motors and avoiding the dead angle of starting the inner-rotor-type motors.

The invention discloses an inner-rotor-type motor comprising a casing, a shaft and a claw-pole member. The shaft is rotatably coupled to the casing, and coupled to a permanent magnet having a magnetism-inducing surface. The claw-pole member is coupled within the casing and has an annular portion and a plurality of salient-poles. The annular portion has an inner circumferential wall. Each of the plurality of salient-poles is disposed between the annular portion and a respective pole plate. The inner circumferential wall faces the pole plates. Each of the pole plates has a first side and a second side substantially extending along an axial direction of the pole plates. The first side and the second side oppose each other. A magnetic pole surface is formed between the first side and the second side and faces the magnetism-inducing surface of the permanent magnet. An air gap is formed between the magnetic pole surface and the magnetism-inducing surface. Each of the pole plates has an extension portion adjacent to the first side and a shrinking portion adjacent to the second side, such that the air gap is formed with an uneven distance between the magnetic pole surface and the magnetism-inducing surface. The coil unit is coupled to the plurality of salient-poles.

Furthermore, the invention discloses an inner-rotor-type motor comprising a casing, a shaft, a claw-pole member and a coil unit. The shaft is rotatably coupled to the casing, and coupled to a permanent magnet having a magnetism-inducing surface. The permanent magnet is located inside the casing. The claw-pole member is coupled within the casing and has an annular portion and a plurality of salient-poles. The annular portion has an inner circumferential wall. Each of the plurality of salient-poles is disposed between the annular portion and a respective pole plate. The inner circumferential wall faces the pole plates. Each of the pole plates has a first side and a second side substantially extending along an axial direction of the pole plates. The first side and the second side oppose each other. A magnetic pole surface is formed between the first side and the second side and faces the magnetism-inducing surface of the permanent magnet. An air gap is formed between the magnetic pole surface and the magnetism-inducing surface. A reference plane passing through a central axis of the annular portion and a central line of one of the plurality of salient-poles is defined. A common line where the magnetic pole surface and the reference plane meet is obtained. The magnetic pole surface is separated into a first magnetic pole surface and a second magnetic pole surface by the common line. The first magnetic pole surface is located between the first side and the common line, and the second magnetic pole surface is located between the second side and the common line. The area of the first magnetic pole surface is different from that of the second magnetic pole surface. The coil unit is coupled to the plurality of salient-poles of the claw-pole member.

Furthermore, the invention discloses a claw-pole member of an inner-rotor-type motor comprising an annular portion, a plurality of salient-poles and a plurality of pole plates. The annular portion has an inner circumferential wall. The plurality of salient-poles is radially extended from the inner circumferential wall to a central axis of the annular portion. Each of the plurality of pole plates has a first side and a second side substantially extending along an axial direction thereof. The first side and the second side oppose each other. A magnetic pole surface is formed between the first side and the second side. Each of the plurality of pole plates has an extension portion adjacent to the first side and a shrinking portion adjacent to the second side. Each of the plurality of salient-poles is disposed between the annular portion and a respective one of the plurality of pole plates. The inner circumferential wall faces the plurality of pole plates.

Furthermore, the invention discloses a claw-pole member of an inner-rotor-type comprising an annular portion, a plurality of salient-poles and a plurality of pole plates. The annular portion has an inner circumferential wall. The plurality of salient-poles is radially extended from the inner circumferential wall to a central axis of the annular portion. Each of the plurality of pole plates has a first side and a second side substantially extending along an axial direction thereof. The first side and the second side oppose each other. A magnetic pole surface is formed between the first side and the second side. A reference plane passing through the central axis of the annular portion and a central line of one of the plurality of salient-poles is defined. A common line where the magnetic pole surface and the reference plane meet is defined. The magnetic pole surface is separated into a first magnetic pole surface and a second magnetic pole surface by the common line. The first magnetic pole surface is located between the first side and the common line, and the second magnetic pole surface is located between the second side and the common line. The area of the first magnetic pole surface is different from that of the second magnetic pole surface. Each of the plurality of salient-poles is disposed between the annular portion and a respective one of the plurality of pole plates. The inner circumferential wall faces the plurality of pole plates

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
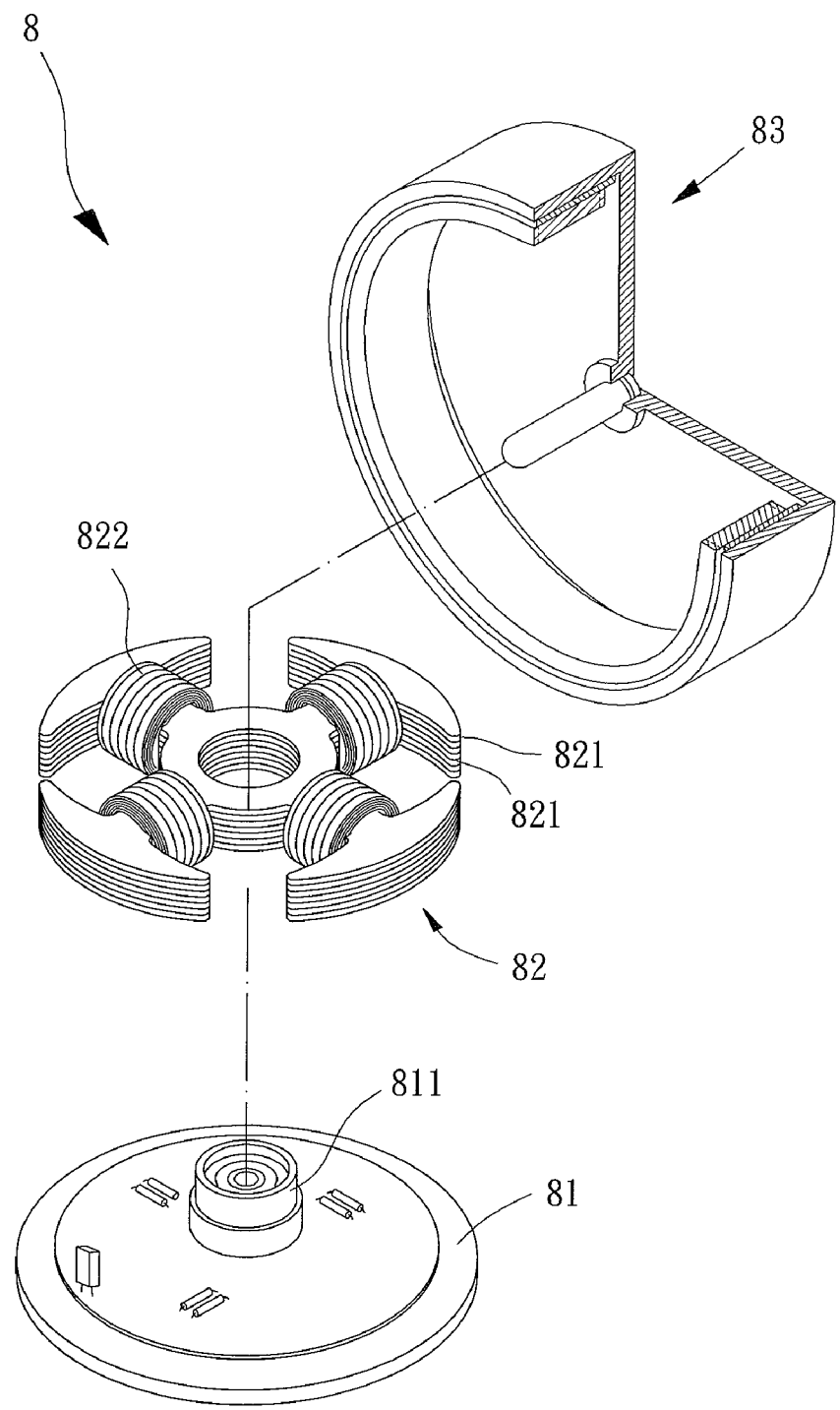
FIG. 1 shows an exploded diagram of a traditional outer-rotor-type motor.
Figure 2:
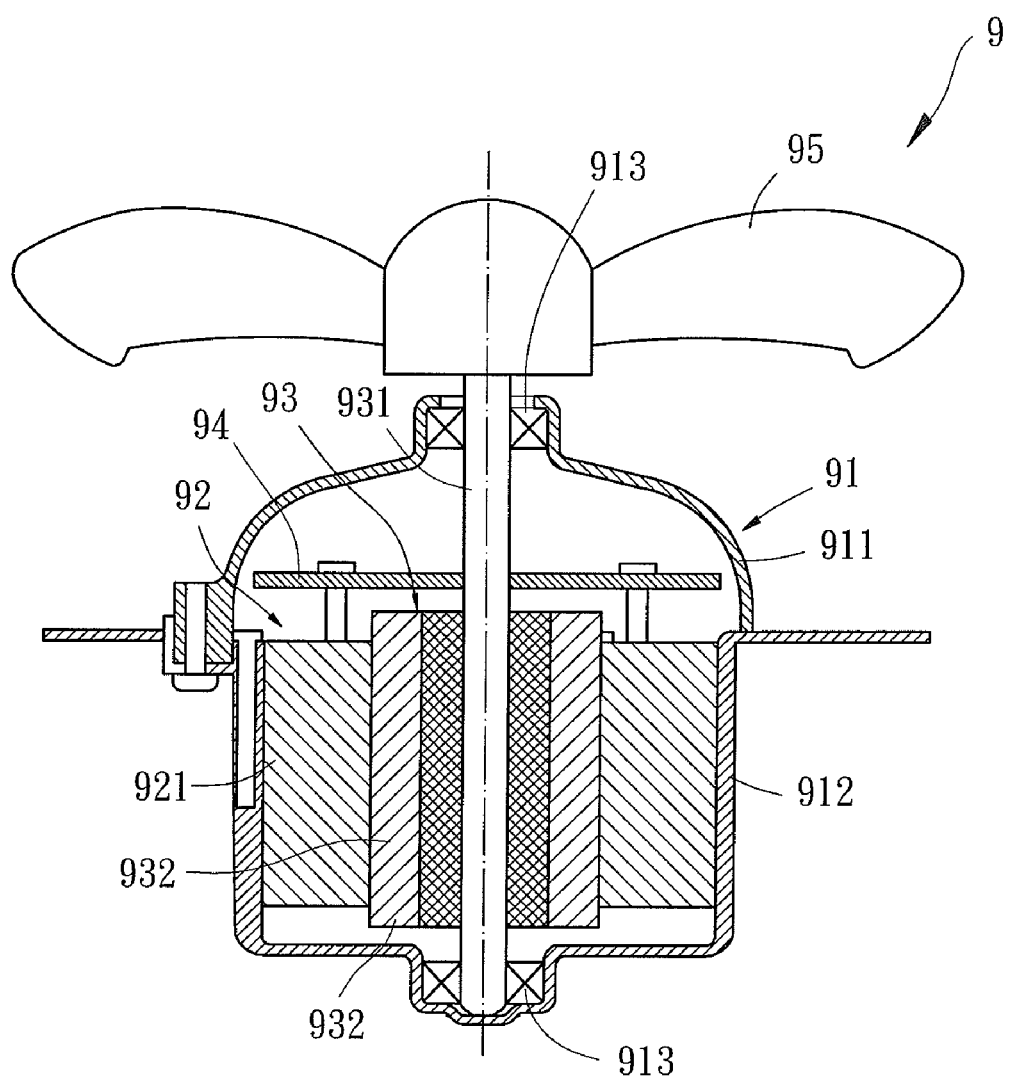
FIG. 2 shows a diagram of an inner-rotor-type motor.

In the various figures of the drawings, the same numerals designate the same or similar parts. Furthermore, when the term "first", "second", "third", "fourth", "inner", "outer" "top", "bottom" and similar terms are used hereinafter, it should be understood that these terms have reference only to the structure shown in the drawings as it would appear to a person viewing the drawings and are utilized only to facilitate describing the invention.

DETAILED DESCRIPTION OF THE INVENTION

Figure 3:
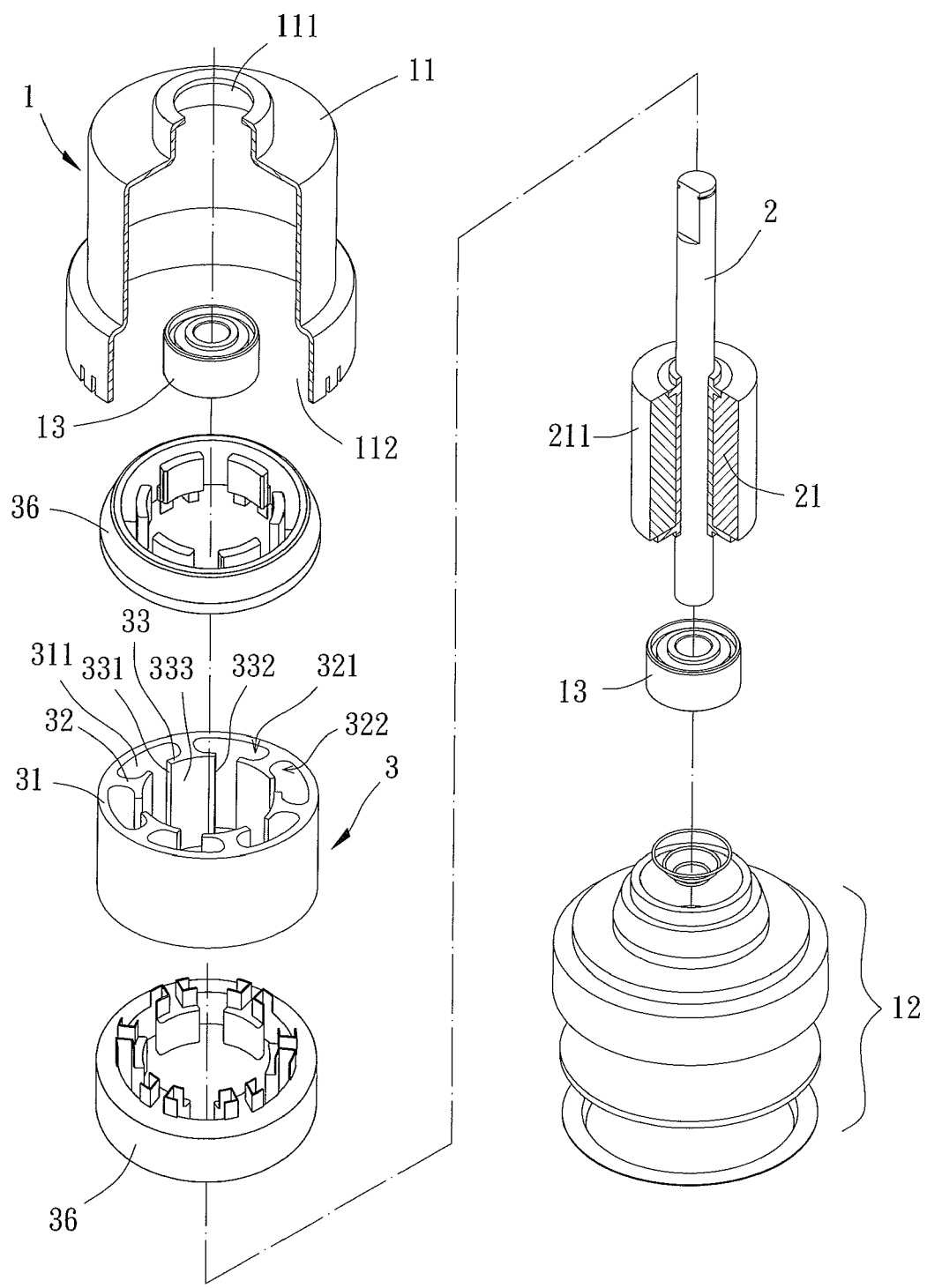
FIG. 3 shows an exploded diagram of an inner-rotor-type motor according to a first embodiment of the invention.
Figure 4:
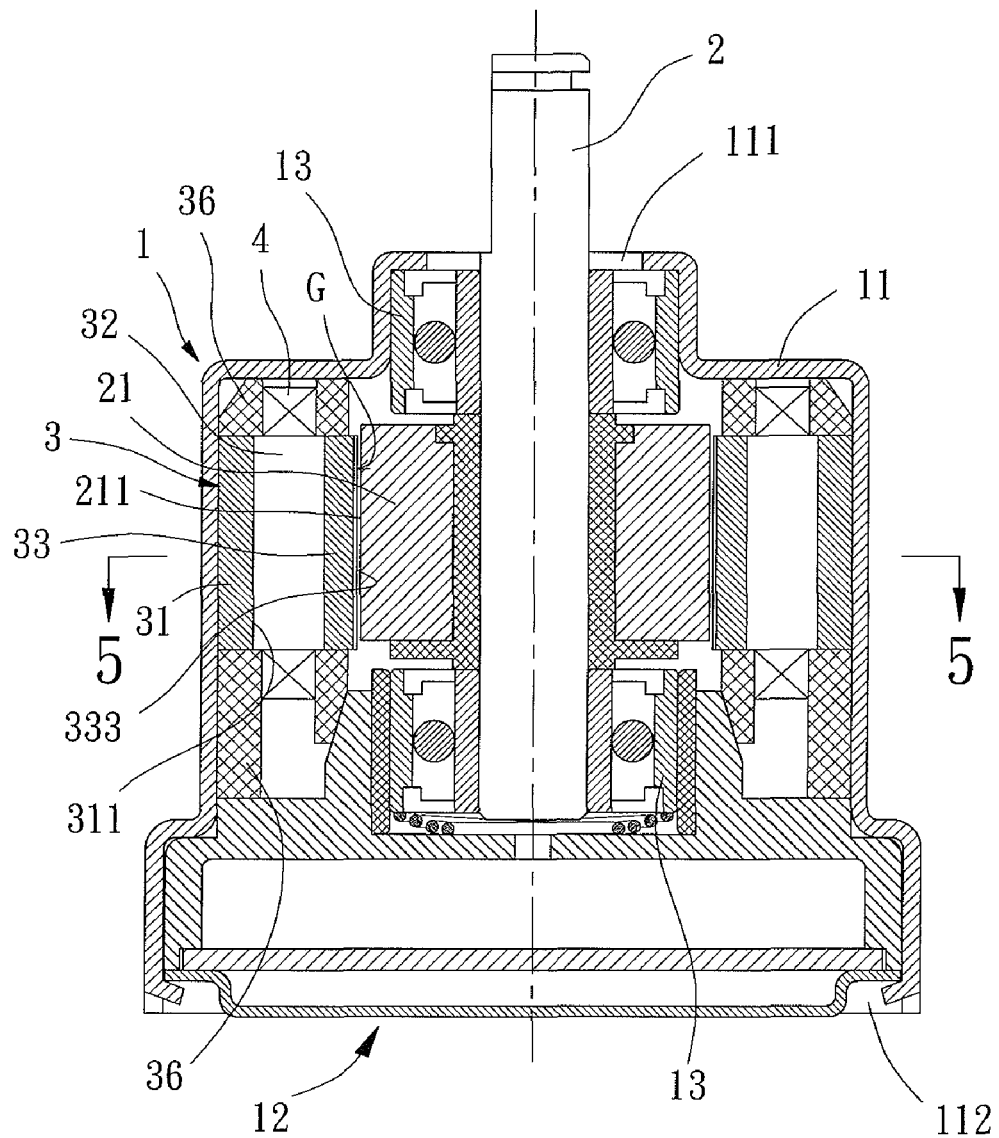
FIG. 4 shows a side cross sectional view of the inner-rotor-type motor according to the first embodiment of the invention.
Figure 5:
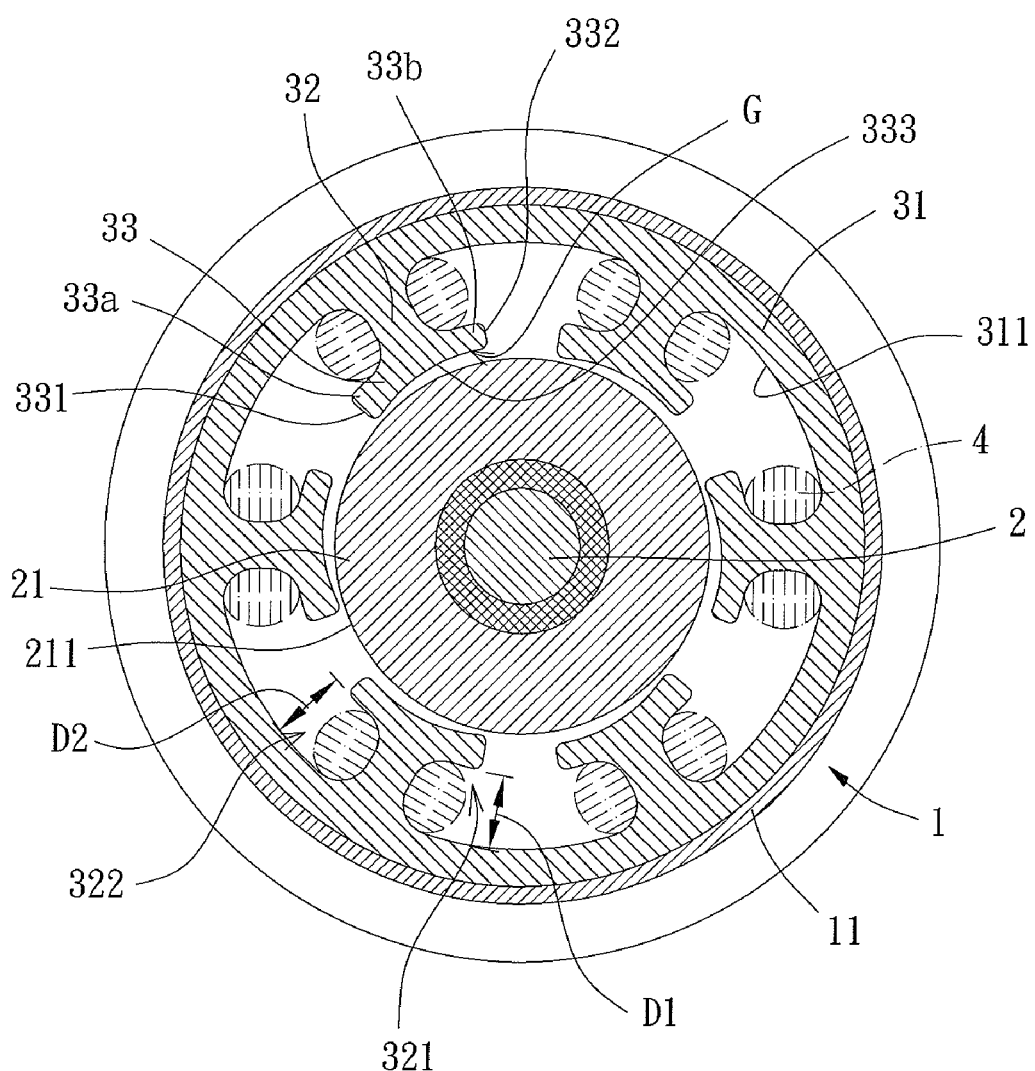
FIG. 5 shows an upper cross sectional view taken along line 5-5 of FIG. 4 of the inner-rotor-type motor according to the first embodiment of the invention.

Please refer to FIGS. 3 to 5, an inner-rotor-type motor is shown according to a first embodiment of the invention. The inner-rotor-type motor comprises a casing 1, a shaft 2, a claw-pole member 3 and a coil unit 4. The casing 1 is hollow, and the shaft 2 may be rotatably coupled to the casing 1. The claw-pole member 3 is coupled within the casing 1. The coil unit 4 is wound around a predetermined portion of the claw-pole member 3. As such, the coil unit 4, after being electrified, may enable the claw-pole member 3 to generate a magnetic field, thereby triggering rotation of the shaft 2.

Since the casing 1 is provided to receive the claw-pole member 3 and to rotatably couple with the shaft 2, the casing 1 may be designed as any structure capable of achieving the purpose described above. In the embodiment, the casing 1 comprises a shell 11 and an enclosed member 12. The shell 11 defines a compartment, and a through hole 111 and an opening 112 are formed on two opposite sides of the shell 11 and communicate with the compartment. The enclosed member 12 is fitted into the shell 11 via the opening 112. A plurality of bearings 13 is disposed inside the shell 11 (or may be only one bearing 13). One of the bearings 13 may be coupled with a side of the through hole 111, and another one of the bearings 13 may be coupled with the enclosed member 12.

The shaft 2 is coupled with the bearings 13 via the through hole 111 such that the shaft 2 is rotatably coupled to the casing 1. An end of the shaft 2 may be exposed outside the casing 1. The shaft 2 is coupled with a permanent magnet 21 having a magnetism-inducing surface 211. The permanent magnet 21 is located in the compartment of the casing 1.

The claw-pole member 3 may be formed by stacking a plurality of claw-pole plates with each other, or formed by way of integral molding. Preferably, the claw-pole member 3 is formed by way of integral molding to improve the manufacturing convenience. As shown in FIG. 5, the claw-pole member 3 in the embodiment is closely coupled within the casing 1 and has an annular portion 31 and a plurality of salient-poles 32. The annular portion 31 has an inner circumferential wall 311. The plurality of salient-poles 32 is radially extended from the inner circumferential wall 311 to a central axis of the annular portion 31. In particular, each salient-pole 32 is disposed between the annular portion 31 and a respective pole plate 33, with the inner circumferential wall 311 facing the pole plates 33. Specifically, the annular portion 31, salient-poles 32, and pole plates 33 may be integrally formed as a claw-pole entity (i.e. the claw-pole member 3) or separately shaped before being combined into the claw-pole member 3, depending on requirements. According to the FIG. 3, the pole plate 33 has a first side 331 and a second side 332 substantially extending along an axial direction of the pole plate 33, with the first side 331 and the second side 332 opposing each other. A magnetic pole surface 333 is formed between the first side 331 and the second side 332 and faces the magnetism-inducing surface 211 of the permanent magnet 21. An air gap G is formed between the magnetic pole surface 333 and the magnetism-inducing surface 211.

Specifically, in a radial section of the pole plate 33 (with reference made to FIG. 5), the pole plate 33 forms an extension portion 33a adjacent to the first side 331, as well as a shrinking portion 33b adjacent to the second side 332. The extension portion 33a and the shrinking portion 33b should be designed to have different radial sectional areas. For example, the first side 331 is designed to have a radial sectional area relatively larger than that of the second side 332 while increasing the volume of the first side 331, or the second side 332 is designed to have a radial sectional area relatively smaller than that of the first side 331 while decreasing the volume of the second side 332. In this way, the distance between the extension portion 33a and the permanent magnet 21 is smaller than that between the shrinking portion 33b and the permanent magnet 21, such that the air gap G is formed to be an uneven-distance air gap. Specifically, the portion of the air gap G adjacent to the extension portion 33a would have a smaller radial distance than that of the portion of the air gap G adjacent to the shrinking portion 33b. The methods to form the extension portion 33a and the shrinking portion 33b may be substantially categorized into different categories as described below, which may only be regarded as preferred embodiments and should not be taken in a limited sense, as the similar ideas are encompassed by the invention.

Firstly, as shown in FIG. 5, the radial sectional area of the pole plate 33 is designed to have been gradually reduced heading from the first side 331 to the second side 332. As such, the extension portion 33a and the shrinking portion 33b are formed.

Figure 6:
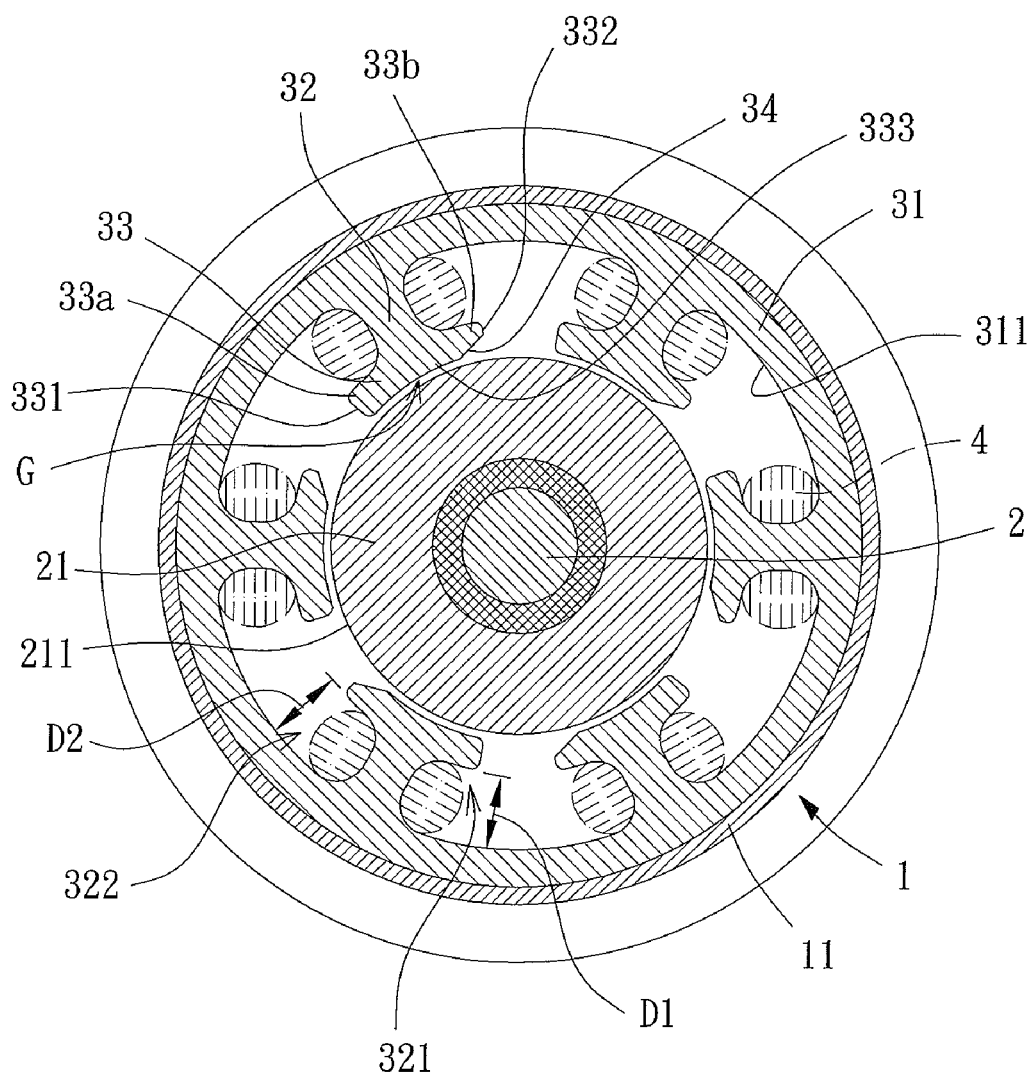
FIG. 6 shows another upper cross sectional view of the inner-rotor-type motor according to the first embodiment of the invention.

Secondly, as shown in FIG. 6, a cutoff surface 34 is designed on the second side 332 of the pole plate 33. With the cutoff surface 34, the radial sectional area around the second side 332 would be smaller than that around the first side 331. As such, the extension portion 33a and the shrinking portion 33b may be formed via the slight modification of the pole plate 33.

Figure 7:
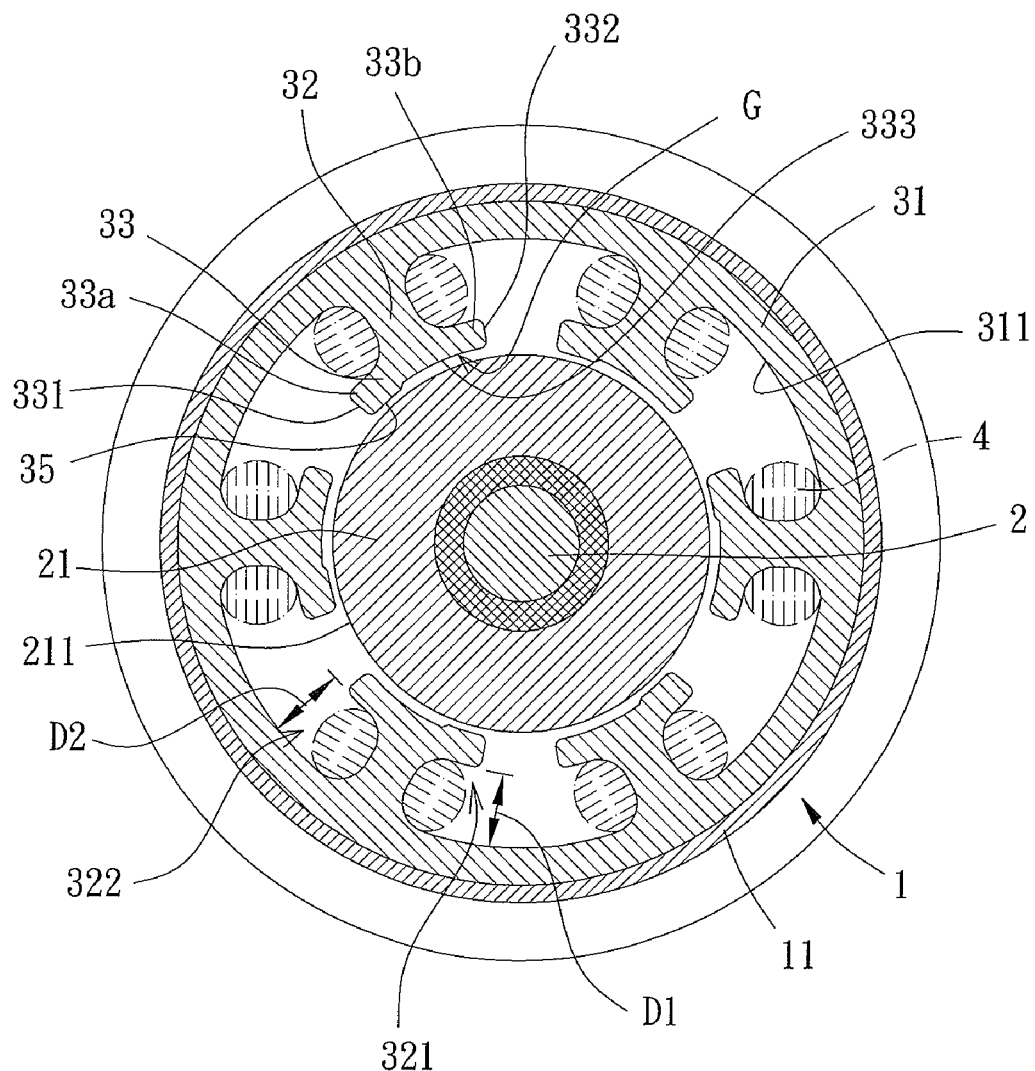
FIG. 7 shows another upper cross sectional view of the inner-rotor-type motor according to the first embodiment of the invention.
Figure 8:
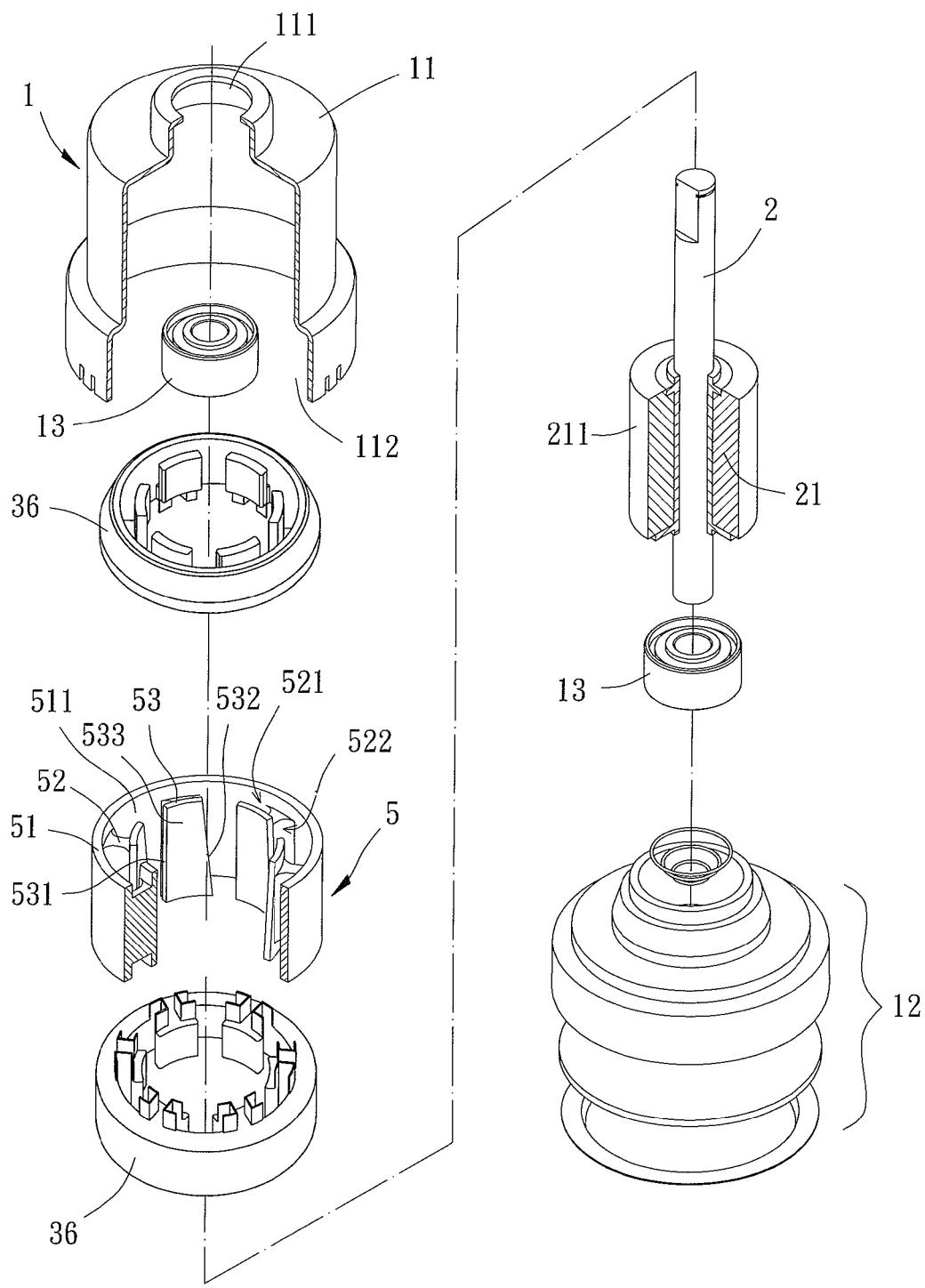
FIG. 8 shows an exploded diagram of an inner-rotor-type motor according to a second embodiment of the invention.

Thirdly, as shown in FIG. 7, a protrusion 35 is designed on the magnetic pole surface 333 of the claw-pole member 3, with the protrusion 35 being adjacent to the first side 331. Through the protrusion 35, the radial sectional area around the first side 331 of the claw-pole member 3 would be larger than that around the second side 332. As such, not only can the protrusion 35 reinforce the structural intensity of the pole plate 33, but also can form the extension portion 33a and the shrinking portion 33b.

The coil unit 4 may be wound around the salient-poles 32 of the claw-pole member 3, and two insulation coverings 36 may be combined to two ends of the claw-pole member 3 before the salient-poles 32 are wound by the coil unit 4. Alternatively, an insulation layer (not shown) may be directly formed on the surface of the claw-pole member 3 without the insulation coverings 36, to provide insulation for the claw-pole member 3. Referring to FIG. 5, a first winding space 321 and a second winding space 322 may be formed on two opposing sides of each salient-pole 32 of the claw-pole member 3. For any given salient-pole 32 with a corresponding pole plate 33 coupled therewith, the distance (D1) between the inner circumferential wall 311 and the corresponding pole plate 33 in the first winding space 321 is preferably the same as a distance (D2) between the inner circumferential wall 311 and the corresponding pole plate 33 in the second winding space 322, as shown in FIGS. 5, 6 and 7. In this way, as the coil unit 4 is wound around the given salient-pole 32, the winding distributed in the first winding space 321 would be substantially the same as that distributed in the second winding space 322.

With the structure described previously, the inner-rotor-type motor of the first embodiment is mainly characterized by that an uneven-distance air gap may be formed between the magnetic pole surface 333 and the magnetism-inducing surface 211 by properly designing the extension portion 33a and the shrinking portion 33b of the pole plate 33. In this way, when the coil unit 4 is electrified, the reluctance of the portion of the air gap G adjacent to the extension portion 33a would be different from that of the portion of the air gap G adjacent to the shrinking portion 33b. As a result, an uneven magnetic force results, and the rotation of the rotor is triggered, thus achieving an easy start of the proposed inner-rotor-type motor and avoiding the dead angle of starting the motor.

Please refer to FIGS. 8, 9, 10 and 11, an inner-rotor-type motor comprising a casing 1, a shaft 2, a coil unit 4 and a claw-pole member 5 is shown. The casing 1, shaft 2 and coil unit 4 have been described above, so they are not discussed herein for brevity.

Similarly to the claw-pole member 3 in the first embodiment, the claw-pole member 5 in the second embodiment comprises an annular portion 51, an inner circumferential wall 511, a plurality of salient-poles 52, a first winding space 521 and a second winding space 522. In addition, a pole plate 53 is formed on an end of each salient-pole 52. The pole plate 53 has a first side 531 and a second side 532, with the first side 531 and the second side 532 opposing each other. A magnetic pole surface 533 is formed between the first side 531 and the second side 532. An air gap G is formed between the magnetic pole surface 533 and the magnetism-inducing surface 211.

Figure 9:
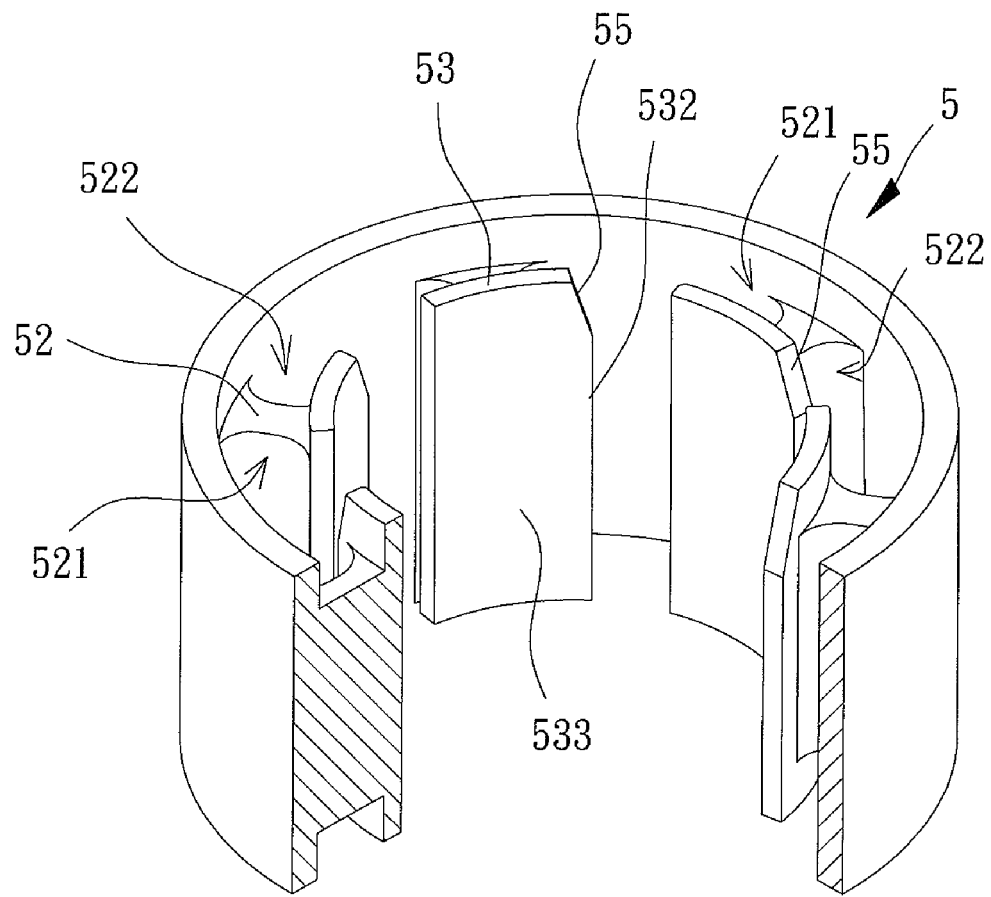
FIG. 9 shows a diagram of a claw-pole member according to the second embodiment of the invention.
Figure 10:
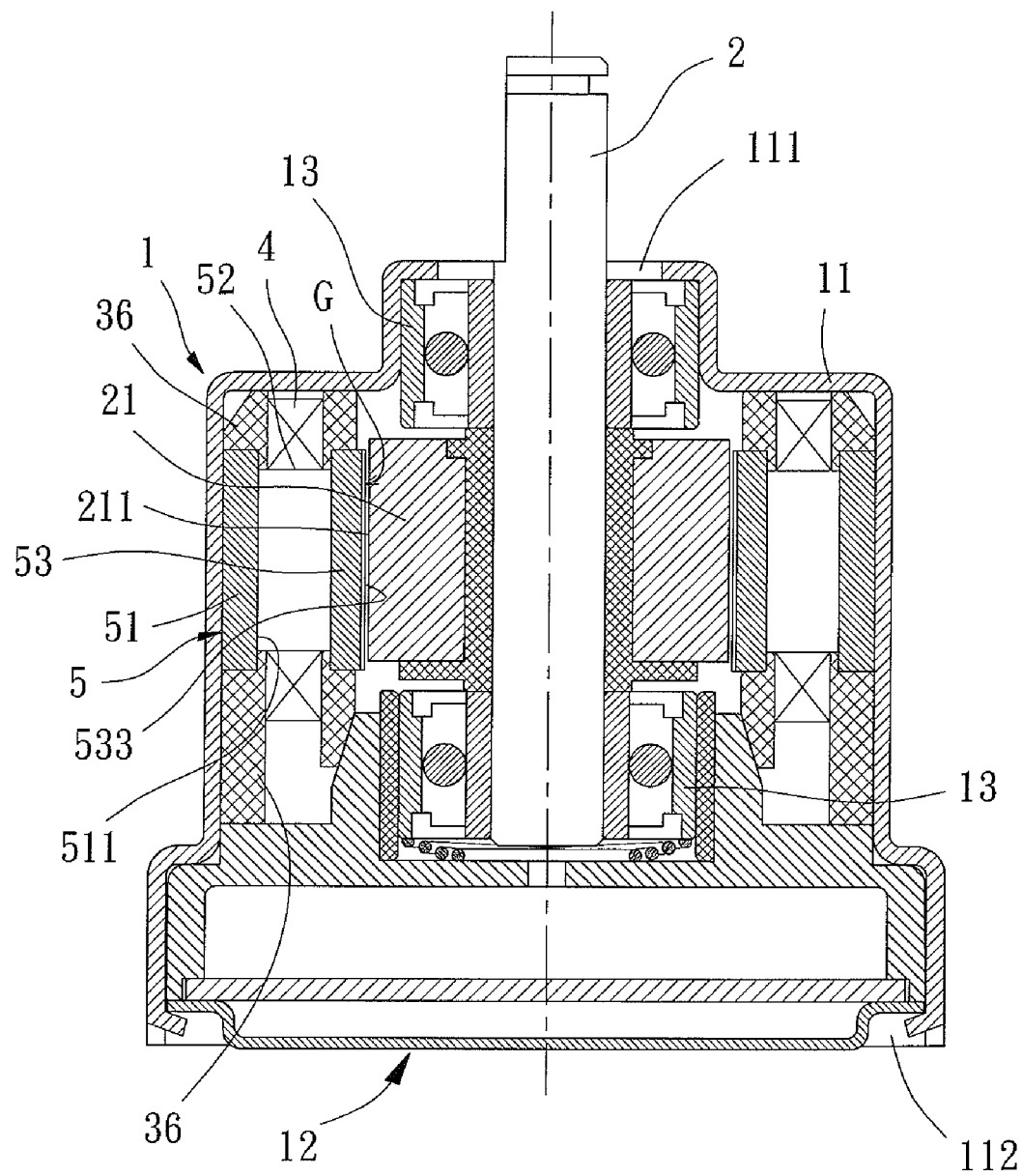
FIG. 10 shows a side cross sectional view of the inner-rotor-type motor according to the second embodiment of the invention.
Figure 11:
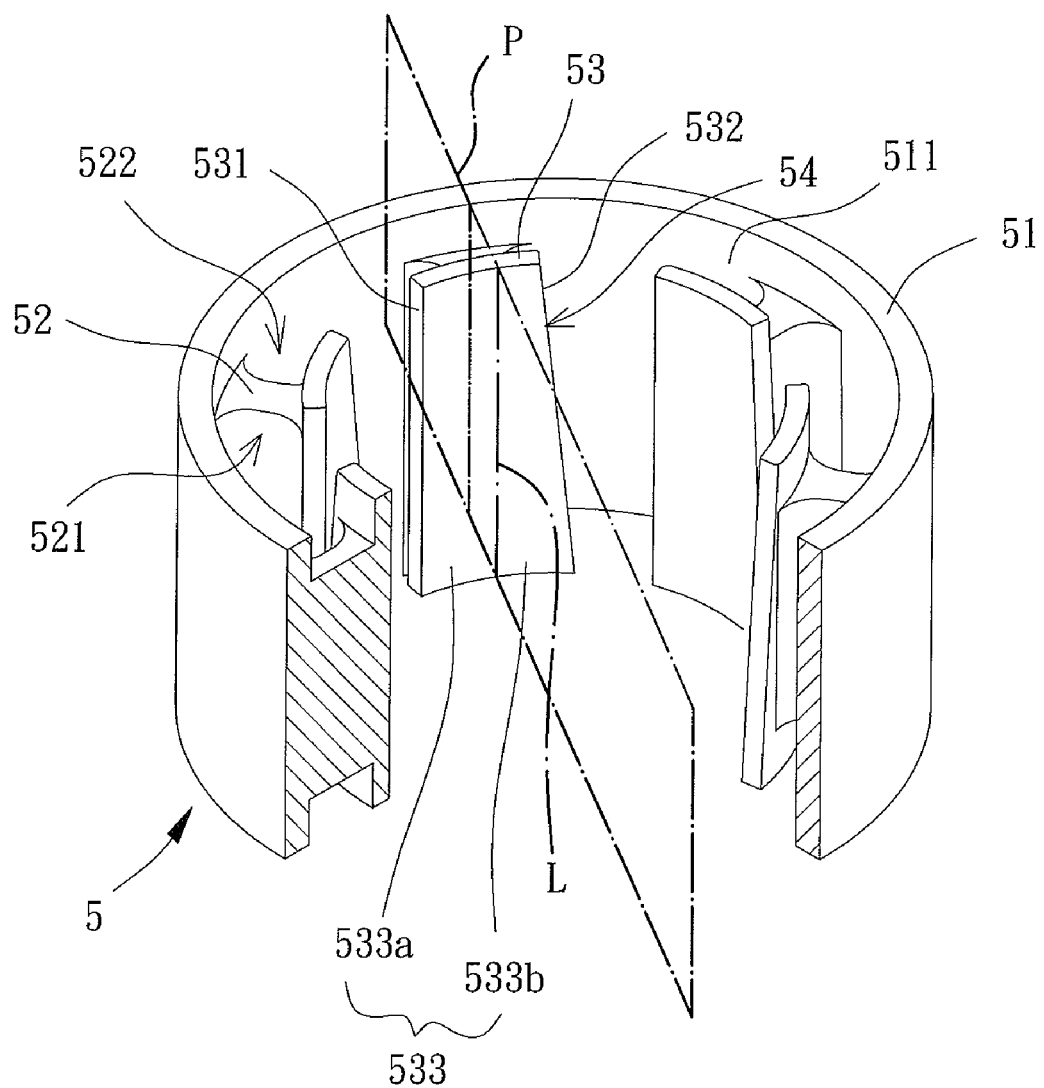
FIG. 11 shows a diagram of a claw-pole member, with a common line and a reference plane defined for the claw-pole member, according to the second embodiment of the invention.

The difference of the claw-pole member 5 in the second embodiment and the claw-pole member 3 in the first embodiment is described below. As shown in FIG. 11, a reference plane P passing through a central axis of the annular portion 51 and a central line of a given salient-pole 52 is defined. Accordingly, a common line L where the magnetic pole surface 533 and the reference plane P meet is obtained. Based on the common line L, the magnetic pole surface 533 may be separated into a first magnetic pole surface 533a and a second magnetic pole surface 533b. The first magnetic pole surface 533a is located between the first side 531 and the common line L, and the second magnetic pole surface 533b is located between the second side 532 and the common line L, with the area of the first magnetic pole surface 533a being different from that of the second magnetic pole surface 533b. For example, in an axial direction of the claw-pole member 5, a cutoff portion 54 is formed on the second side 532 of the pole plate 53. Through the cutoff portion 54, the area of the first magnetic pole surface 533a is designed to be larger than that of the second magnetic pole surface 533b. Note any other implementations capable of resulting in an area asymmetry for the first magnetic pole surface 533a and the second magnetic pole surface 533b are also encompassed by the invention, such as forming a cutoff piece 55 on the magnetic pole surface 533 as shown in FIG. 9.

With the structure described previously, the inner-rotor-type motor of the second embodiment is characterized by that the reluctance adjacent to the first side 531 is different from that adjacent to the second side 532 due to an area asymmetry of the first magnetic pole surface 533a and the second magnetic pole surface 533b, thereby achieving the easy start of the motor and avoiding the dead angle of starting the motor.

Figure 12:
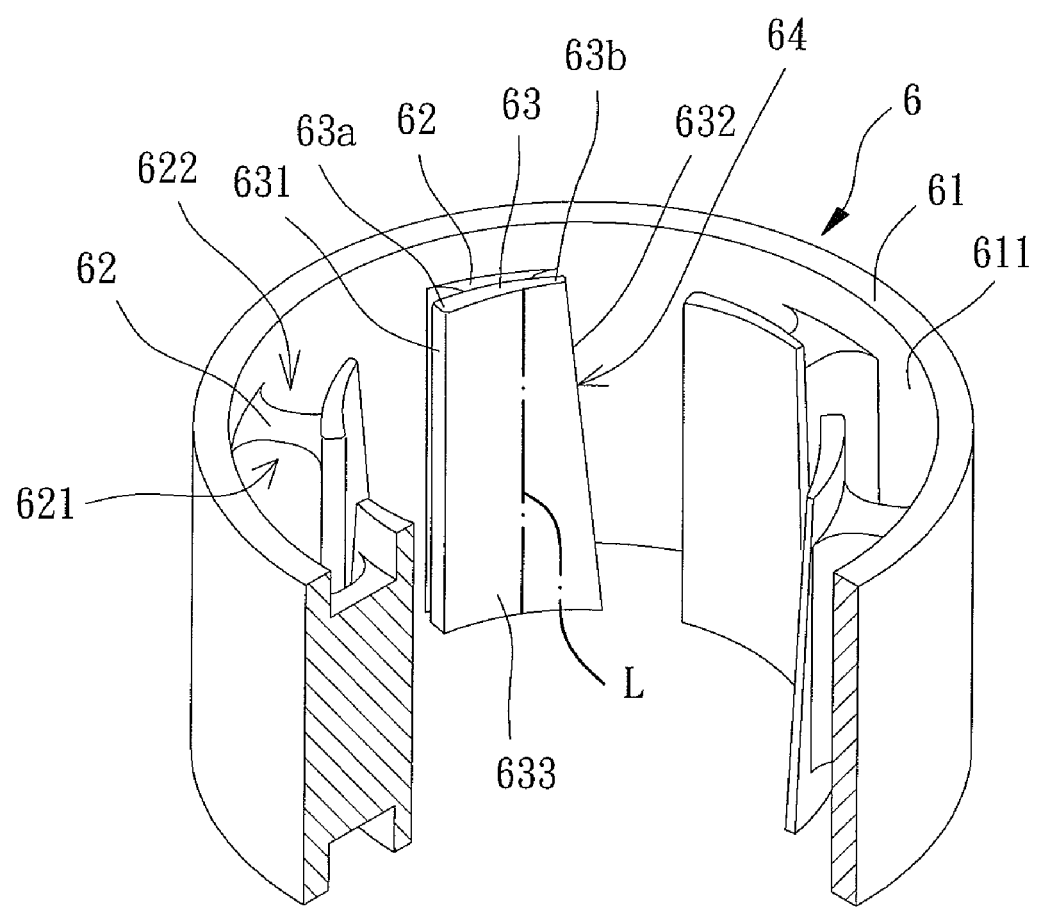
FIG. 12 shows a diagram of a claw-pole member according to a third embodiment of the invention.

Please refer to FIG. 12, a claw-pole member 6 is shown according to a third embodiment of the invention. The claw-pole member 6 may also be combined with the casing 1, shaft 2 and coil unit 4 to form the inner-rotor-type motor of the invention.

Similarly to the claw-pole members 3 and 5 in the first and second embodiments, the claw-pole member 6 in the third embodiment comprises an annular portion 61, an inner circumferential wall 611, a plurality of salient-poles 62, a first winding space 621 and a second winding space 622. In addition, a pole plate 63 is formed on an end of each salient-pole 62. The pole plate 63 has a first side 631 and a second side 632, with the first side 631 and second side 632 opposing each other. A magnetic pole surface 633 is formed between the first side 631 and the second side 632.

The difference of the claw-pole member 6 in the third embodiment and the claw-pole members 3 and 5 in the first and second embodiments is described below. The claw-pole member 6 has combined both structural features of the claw-pole members 3 and 5 disclosed in the first and second embodiments. Additionally, in a radial section of a given pole plate 63, an extension portion 63a adjacent to the first side 631, as well as a shrinking portion 63b adjacent to the second side 632, is formed. A cutoff portion 64 is further formed on the second side 632 of the given pole plate 63. In this way, since the claw-pole member 6 has combined both structural features of the claw-pole members 3 and 5, the proposed inner-rotor-type motor in the third embodiment may be started even more easily, and the dead angle of starting the motor is avoided.

Figure 13:
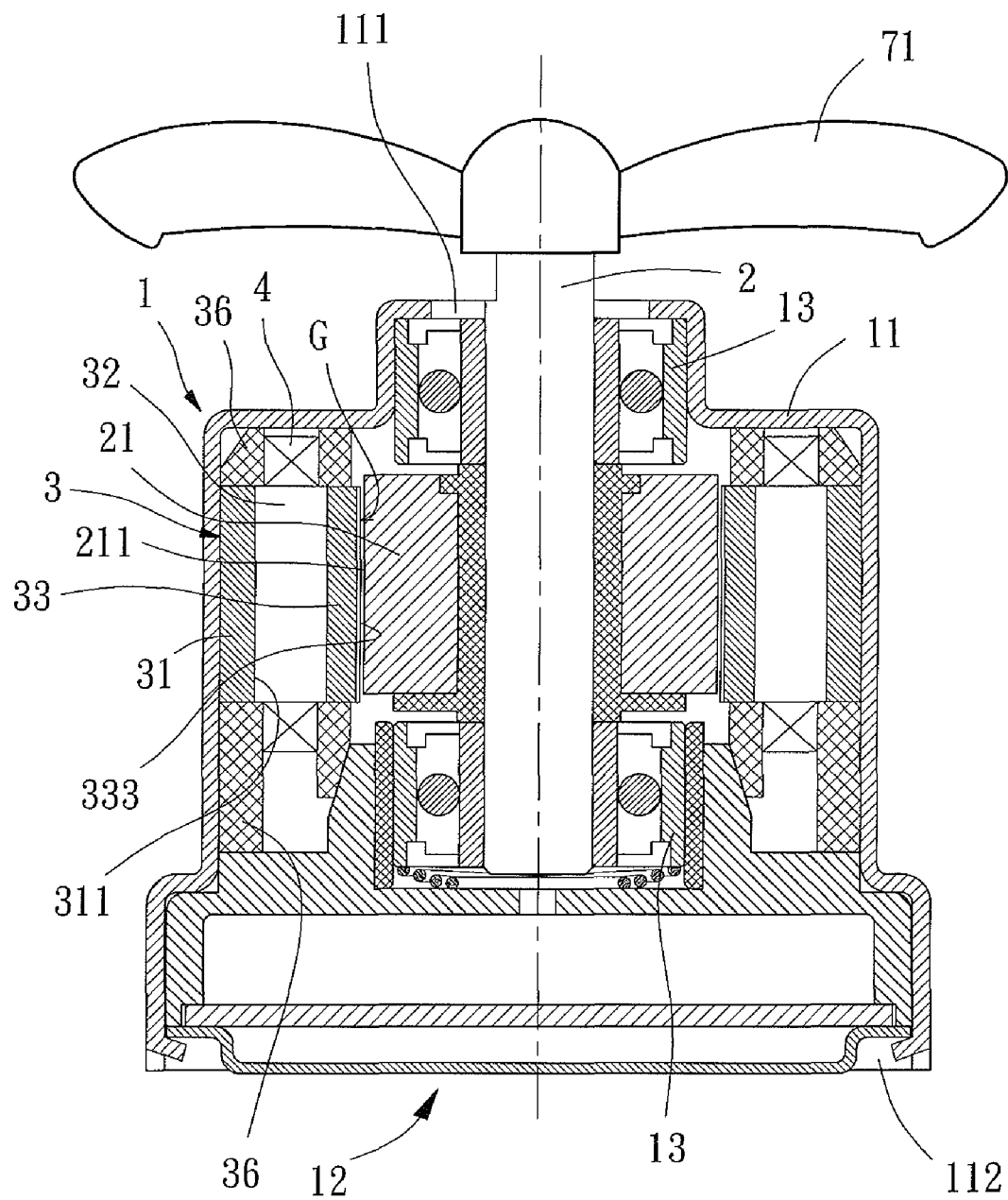
FIG. 13 shows a side cross sectional view of a heat-dissipating fan employing the proposed inner-rotor-type according to an embodiment(s) of the invention.
Figure 14:
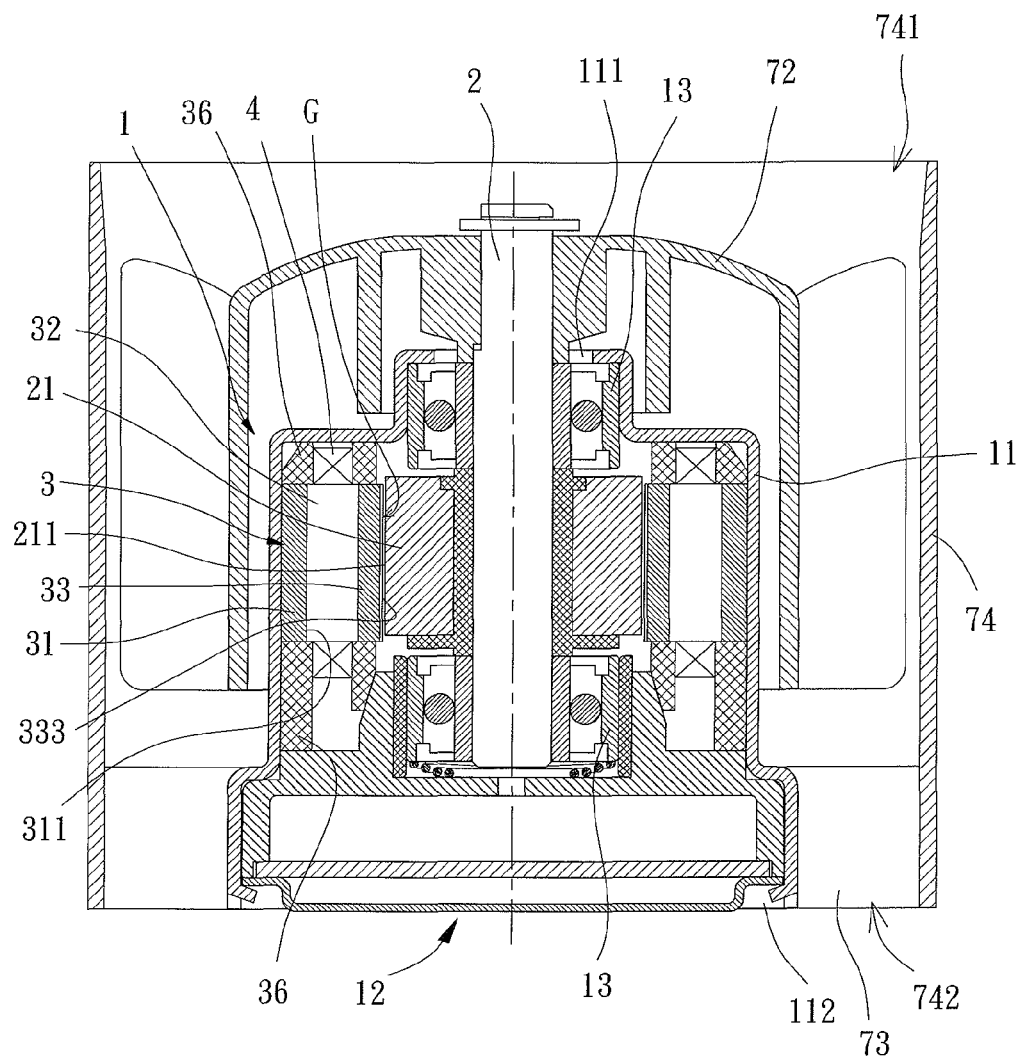
FIG. 14 shows a side cross sectional view of another heat-dissipating fan employing the proposed inner-rotor-type according to an embodiment(s) of the invention.

The inner-rotor-type motor may be further applied to a heat-dissipating fan. For example, referring to FIG. 13, the portion of the shaft 2 outside the casing 1 may be coupled to a blade 71 to form a heat-dissipating fan. Alternatively, referring to FIG. 14, the portion of the shaft 2 outside the casing 1 may be coupled to a fan wheel 72, and the casing 1 may be externally coupled to a fan frame 74 via a plurality of connection members 73 (such as ribs or stationary blades) to form a heat-dissipating fan having an air inlet 741 and an air outlet 742. In this way, the heat-dissipating fan may be equipped in various electronic devices or instruments for heat dissipation.

Based on the above description, the invention efficiently overcomes the difficulty in starting the inner-rotor-type motor and avoids the dead angle of starting the motor via the claw-pole members 3, 5 and 6 disclosed in the various embodiments, thereby improving the operation efficiency of the inner-rotor-type motor.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An inner-rotor-type motor, comprising:
   a casing;
   a shaft rotatably coupled to the casing and coupled to a permanent magnet having a magnetism-inducing surface, wherein the permanent magnet is located inside the casing;
   a claw-pole member coupled within the casing and having an annular portion and a plurality of salient-poles, wherein the annular portion has an inner circumferential wall, wherein each of the plurality of salient-poles is disposed between the annular portion and a respective pole plate, wherein the inner circumferential wall faces the pole plates, wherein each of the pole plates has a first side and a second side substantially extending along an axial direction of the pole plates, wherein the first side and the second side oppose each other, wherein a magnetic pole surface is formed between the first side and the second side and faces the magnetism-inducing surface of the permanent magnet, wherein an air gap is formed between the magnetic pole surface and the magnetism-inducing surface, wherein each of the pole plates has an extension portion adjacent to the first side and a shrinking portion adjacent to the second side, wherein the air gap is formed with an uneven distance between the magnetic pole surface and the magnetism-inducing surface; and
   a coil unit coupled to the plurality of salient-poles of the claw-pole member.

2. The inner-rotor-type motor as claimed in claim 1, wherein a radial sectional area of each of the pole plates has been gradually reduced heading from the first side to the second side.

3. The inner-rotor-type motor as claimed in claim 1, wherein a cutoff surface is formed on the second side of each of the pole plates.

4. The inner-rotor-type motor as claimed in claim 1, wherein a protrusion is formed on the magnetic pole surface of the claw-pole member, and wherein the protrusion is adjacent to the first side.

5. The inner-rotor-type motor as claimed in claim 1, wherein a first winding space and a second winding space are formed on two opposing sides of each of the plurality of salient-poles, and wherein a distance between the inner circumferential wall and the pole plate in the first winding space is substantially the same as that between the inner circumferential wall the pole plate in the second winding space in a radial direction of the claw-pole member.

6. The inner-rotor-type motor as claimed in claim 1, wherein a reference plane passing through a central axis of the annular portion and a central line of one of the plurality of salient-poles is defined, a common line where the magnetic pole surface and the reference plane meet is obtained, the magnetic pole surface is separated into a first magnetic pole surface and a second magnetic pole surface by the common line, wherein the first magnetic pole surface is located between the first side and the common line, wherein the second magnetic pole surface is located between the second side and the common line, and wherein the area of the first magnetic pole surface is different from that of the second magnetic pole surface.

7. The inner-rotor-type motor as claimed in claim 1, wherein the casing comprises a shell and an enclosed member, wherein a through hole and an opening are formed on two opposing sides of the shell, wherein the enclosed member is coupled within the shell via the opening, wherein at least one bearing is disposed inside the shell, and wherein the shaft is coupled to the at least one bearing via the through hole.

8. An inner-rotor-type motor, comprising:
   a casing;
   a shaft rotatably coupled to the casing and coupled to a permanent magnet having a magnetism-inducing surface, wherein the permanent magnet is located inside the casing;
   a claw-pole member coupled within the casing and having an annular portion and a plurality of salient-poles, wherein the annular portion has an inner circumferential wall, wherein each of the plurality of salient-poles is disposed between the annular portion and a respective pole plate, wherein the inner circumferential wall faces the pole plates, wherein each of the pole plates has a first side and a second side substantially extending along an axial direction of the pole plates, wherein the first side and the second side oppose each other, wherein a magnetic pole surface is formed between the first side and the second side and faces the magnetism-inducing surface of the permanent magnet, wherein an air gap is formed between the magnetic pole surface and the magnetism-inducing surface, wherein a reference plane passing through a central axis of the annular portion and a central line of one of the plurality of salient-poles is defined, wherein a common line where the magnetic pole surface and the reference plane meet is obtained, the magnetic pole surface is separated into a first magnetic pole surface and a second magnetic pole surface by the common line, wherein the first magnetic pole surface is located between the first side and the common line, wherein the second magnetic pole surface is located between the second side and the common line, and wherein the area of the first magnetic pole surface is different from that of the second magnetic pole surface; and a coil unit coupled to the plurality of salient-poles of the claw-pole member.

9. The inner-rotor-type motor as claimed in claim 8, wherein a cutoff portion is formed on the second side of each of the pole plates or a cutoff piece is formed on the magnetic pole surface, wherein the area of the first magnetic pole surface is larger than that of the second magnetic pole surface.

10. The inner-rotor-type motor as claimed in claim 8, wherein a first winding space and a second winding space are formed on two opposing sides of each of the plurality of salient-poles, and wherein a distance between the inner circumferential wall and the pole plate in the first winding space is substantially the same as that between the inner circumferential wall and the pole plate in the second winding space in a radial direction of the claw-pole member.

11. The inner-rotor-type motor as claimed in claim 8, wherein the casing comprises a shell and an enclosed member, wherein a through hole and an opening are formed on two opposing sides of the shell, wherein the enclosed member is coupled with the opening, wherein at least one bearing is disposed inside the shell, and wherein the shaft is coupled to the at least one bearing via the through hole.

12. A claw-pole member of an inner-rotor-type motor comprising:
an annular portion having an inner circumferential wall;
a plurality of salient-poles radially extended from the inner circumferential wall to a central axis of the annular portion; and
a plurality of pole plates, with each pole plate having a first side and a second side substantially extending along an axial direction thereof, wherein the first side and the second side oppose each other, wherein a magnetic pole surface is formed between the first side and the second side, wherein each of the plurality of pole plates has an extension portion adjacent to the first side and a shrinking portion adjacent to the second side, wherein each of the plurality of salient-poles is disposed between the annular portion and a respective one of the plurality of pole plates, wherein the inner circumferential wall faces the plurality of pole plates, wherein a sectional area of each of the plurality of pole plates has been gradually reduced heading from the first side to the second side.

13. The claw-pole member of the inner-rotor-type motor as claimed in claim 12, wherein a first winding space and a second winding space are formed on two opposing sides of each of the plurality of salient-poles, and wherein a distance between the inner circumferential wall and a respective one of the plurality of pole plates in the first winding space is substantially the same as that between the inner circumferential wall and a respective one of the plurality of pole plates in the second winding space in a radial direction of the claw-pole member.

14. The claw-pole member of the inner-rotor-type motor as claimed in claim 12, wherein a cutoff surface is formed on the second side of each of the plurality of pole plates.

15. The claw-pole member of the inner-rotor-type motor as claimed in claim 12, wherein a protrusion is formed on the magnetic pole surface of the claw-pole member, and wherein the protrusion is adjacent to the first side.

16. A claw-pole member of an inner-rotor-type motor, comprising:
an annular portion having an inner circumferential wall;
a plurality of salient-poles radially extended from the inner circumferential wall to a central axis of the annular portion; and
a plurality of pole plates, with each pole plate having a first side and a second side substantially extending along an axial direction thereof, wherein the first side and the second side oppose each other, wherein a magnetic pole surface is formed between the first side and the second side, wherein a reference plane passing through the central axis of the annular portion and a central line of one of the plurality of salient-poles is defined, wherein a common line where the magnetic pole surface and the reference plane meet is defined, wherein the magnetic pole surface is separated into a first magnetic pole surface and a second magnetic pole surface by the common line, wherein the first magnetic pole surface is located between the first side and the common line, wherein the second magnetic pole surface is located between the second side and the common line, and wherein the area of the first magnetic pole surface is different from that of the second magnetic pole surface, wherein each of the plurality of salient-poles is disposed between the annular portion and a respective one of the plurality of pole plates, and wherein the inner circumferential wall faces the plurality of pole plates.

17. The claw-pole member of the inner-rotor-type motor as claimed in claim 16, wherein a cutoff portion is formed on the second side of each of the plurality of pole plates or a cutoff piece is formed on the magnetic pole surface, wherein the area of the first magnetic pole surface is larger than that of the second magnetic pole surface.

18. The claw-pole member of the inner-rotor-type motor as claimed in claim 16, wherein a first winding space and a second winding space are formed on two opposing sides of each of the plurality of salient-poles, a distance between the inner circumferential wall and a respective one of the plurality of pole plates in the first winding space is substantially the same as that between the inner circumferential wall and a respective one of the plurality of pole plates in the second winding space in a radial direction of the claw-pole member.

* * * * *